United States Patent
Chang et al.

(10) Patent No.: US 9,403,505 B2
(45) Date of Patent: *Aug. 2, 2016

(54) SEAT BELT PRESENTER

(71) Applicant: JOHNSON ELECTRIC S.A., Murten (CH)

(72) Inventors: Hang Fung Chang, Hong Kong (CN); Hang Cheong Ma, Hong Kong (CN); Daniel Ming Hong Wong, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/744,903

(22) Filed: Jan. 18, 2013

(65) Prior Publication Data

US 2013/0187373 A1    Jul. 25, 2013

Related U.S. Application Data

(63) Continuation-in-part of application No. 12/948,510, filed on Nov. 17, 2010, now Pat. No. 9,033,117.

(30) Foreign Application Priority Data

Jan. 20, 2012  (CN) .......................... 2012 1 0018955

(51) Int. Cl.
  *H02K 3/00*    (2006.01)
  *B60R 22/03*   (2006.01)
  *H02K 23/30*   (2006.01)

(52) U.S. Cl.
  CPC ................ *B60R 22/03* (2013.01); *H02K 23/30* (2013.01)

(58) Field of Classification Search
  CPC .................................... H02K 3/04; H02K 3/28
  USPC ............... 310/140–142, 179–180; 280/801.1, 280/801.2, 806, 807
  See application file for complete search history.

(56) References Cited

U.S. PATENT DOCUMENTS

| | | | | |
|---|---|---|---|---|
| 2,761,082 | A * | 8/1956 | Chang | 310/187 |
| 3,952,219 | A * | 4/1976 | Mitsui et al. | 310/257 |
| 5,346,256 | A | 9/1994 | Wiesler et al. | |
| 5,431,446 | A * | 7/1995 | Czarnecki et al. | 280/802 |
| 5,661,355 | A * | 8/1997 | Darceot | 310/180 |
| 5,934,600 | A * | 8/1999 | Darceot | 242/433 |
| 6,308,986 | B1 * | 10/2001 | Townsend et al. | 280/807 |
| 7,152,301 | B2 * | 12/2006 | Rittmeyer | 29/596 |
| 7,239,060 | B2 * | 7/2007 | Cros et al. | 310/198 |
| 7,583,000 | B2 * | 9/2009 | Durham et al. | 310/180 |
| 8,203,246 | B2 * | 6/2012 | Nashiki et al. | 310/195 |
| 8,368,275 | B2 * | 2/2013 | Court et al. | 310/179 |

(Continued)

*Primary Examiner* — James English
(74) *Attorney, Agent, or Firm* — Muncy, Geissler, Olds & Lowe, P.C.

(57) ABSTRACT

A seat belt presenter for moving a tongue plate of a seat belt system to a desired position includes a transmission mechanism for moving the tongue plate and an electric motor for driving the transmission mechanism. The motor includes a stator and a rotor rotatably mounted to the stator. The rotor includes a motor shaft, a commutator fixed to the motor shaft, a rotor core fixed to the motor shaft and rotor windings wound about teeth of the rotor core and electrically connected to segments of the commutator, the rotor windings comprises a plurality of winding units. Each winding unit includes at least two coils, the coils of each winding unit being wound about the same teeth and electrically connected to a same pair of segments, in parallel.

9 Claims, 3 Drawing Sheets

(56) References Cited

U.S. PATENT DOCUMENTS

| | | | |
|---|---|---|---|
| 2002/0011755 A1* | 1/2002 | Shteynberg et al. | 310/184 |
| 2002/0043872 A1* | 4/2002 | Townsend et al. | 297/473 |
| 2006/0108786 A1 | 5/2006 | Sugiyama et al. | |
| 2006/0181073 A1 | 8/2006 | Sugiyama et al. | |
| 2007/0180685 A1* | 8/2007 | Mahfoudh | 29/606 |
| 2007/0278890 A1* | 12/2007 | Huang et al. | 310/211 |
| 2010/0026146 A1* | 2/2010 | Wu et al. | 310/68 R |
| 2010/0259136 A1* | 10/2010 | Hiramoto et al. | 310/68 D |
| 2011/0062697 A1* | 3/2011 | Kimura et al. | 280/801.2 |
| 2011/0147144 A1* | 6/2011 | Ma et al. | 188/162 |
| 2013/0187372 A1* | 7/2013 | Chang et al. | 280/801.1 |
| 2013/0187434 A1* | 7/2013 | Chang et al. | 297/475 |
| 2013/0234637 A1* | 9/2013 | Shinmoto et al. | 318/400.26 |

* cited by examiner

SEAT BELT PRESENTER

CROSS REFERENCE TO RELATED APPLICATIONS

This non-provisional patent application claims priority under 35 U.S.C. §119(a) from Patent Application No. 201210018955.0 filed in The People's Republic of China on Jan. 20, 2012, the entire contents of which are fully incorporated herein by reference, and is a continuation-in-part of U.S. patent application Ser. No. 12/948,510 filed on Nov. 17, 2010, now U.S. Pat. No. 9,033,117, for which priority is claimed under 35 U.S.C. §120, the entire contents of which are fully incorporated herein by reference.

FIELD OF THE INVENTION

This invention relates to a seat belt system for a vehicle and in particular, to an electric motor used in a seat belt presenter of the seat belt system.

BACKGROUND OF THE INVENTION

Seat belt systems were developed to secure the occupant of a vehicle against harmful movement that may result during a collision or a sudden stop. The systems reduce the likelihood and severity of injury in a traffic collision by stopping the vehicle occupant from hitting hard against interior elements of the vehicle or other passengers (the so-called second impact), by keeping occupants positioned correctly for maximum benefit from the airbag and by preventing occupants being ejected from the seat of the vehicle.

A traditional seat belt system comprises a seat belt for restraining the occupant in the seat, a tongue plate arranged on the seat belt, a belt buckle detachably engagable with the tongue plate, and a belt winder for tightening or loosing the seat belt. The tongue plate is slidably fixed to the seat belt, with a stopper fixed to the seat belt to stop the tongue plate from sliding along the seat belt all the way to a lower anchorage. The stopper keeps the tongue plate at a rest position on the seat belt when the seat belt is not in use and is fully retracted by the belt winder without slack. When the occupant is about to wear the seat belt, he must take the tongue plate or seat belt and then apply a certain force in order to pull out the seat belt from the belt winder. However, as the seat belt and the tongue plate slidably mounted thereon is located laterally and rearwardly of the occupant, the occupant has to turn around to reach the tongue plate or seat belt and use an unnatural posture to apply the force. It is uncomfortable and inconvenient for the occupant. To solve the problem, a seat belt presenter for moving the tongue plate to a more convenient position was proposed.

The seat belt presenter uses an electric motor as a source of power. FIG. 4 illustrates a winding scheme of a traditional permanent magnet direct current (PMDC) motor used for driving the seat belt presenter. The rotor windings comprise a plurality of coils wound about teeth of the rotor core and electrically connected to segments of a commutator. For example, coil C1' is wound about teeth T1 and T2 and connected to segments S1 and S2. Coil C2' is wound about teeth T2 and T3 and connected to segments S2 and S3. The PMDC motor comprises two brushes to feed electrical current to the rotor windings. The rotor windings form two parallel branches. When a coil such as coil C1' is open, one of the branches will be open. The motor as well as the seat belt presenter will malfunction.

Therefore, there is a desire for a seat belt presenter with improved reliability.

SUMMARY OF THE INVENTION

Accordingly, the present invention provides a seat belt presenter for moving a tongue plate of a seat belt system to a desired position, comprising: a transmission mechanism for moving the tongue plate from a first position to a second position; and an electric motor for driving the transmission mechanism, the motor comprising a stator and a rotor rotatably mounted to the stator, the rotor comprising a motor shaft, a commutator fixed to the motor shaft, a rotor core fixed to the motor shaft and rotor windings wound about teeth of the rotor core and electrically connected to segments of the commutator, the rotor windings comprises a plurality of winding units, each winding unit comprising at least two coils, the coils of each winding unit being wound about the same teeth and electrically connected to a same pair of segments in parallel.

Preferably, the rotor windings are arranged in two layers, an inner layer and an outer layer, and wherein each winding unit comprises two coils, one of the two coils being arranged in the inner layer, the other one of the two coils being arranged in the outer layer.

Preferably, the two coils are radially spaced from each other.

Preferably, the rotor windings are wound by one continuous wire.

Alternatively, a part of the inner layer coils and a part of the outer layer coils are wound by one continuous wire, and the other part of the inner layer coils and the other part of the outer layer coils are wound by another continuous wire.

Preferably, at least one dummy slot is formed in a circumferential surface of each tooth of the rotor core.

Optionally, the rotor core comprises five teeth, and each tooth comprises two dummy slots formed in a circumferential surface of the tooth.

Preferably, the number of the teeth is the same as the number of the segments.

Preferably, the stator has two magnetic poles, the rotor core has five teeth, and the commutator has five segments.

Preferably, the transmission mechanism comprises a stationary tubular guide, a thrust rod slidably received in the guide, and a converting structure coupled between the motor and the thrust rod for converting the rotary movement of the motor into linear movement of the thrust rod.

In the embodiment of the present invention, both of the coils of each winding unit of rotor windings are wound about the same teeth and are electrically connected to the same segments, in parallel. If one of the coils of a winding unit is open circuited, current still flows through the winding unit via the other coil. Thus, the motor still works, with only a slight performance loss. Therefore, a seat belt presenter using the motor is more reliable compared to traditional seat belt presenters.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
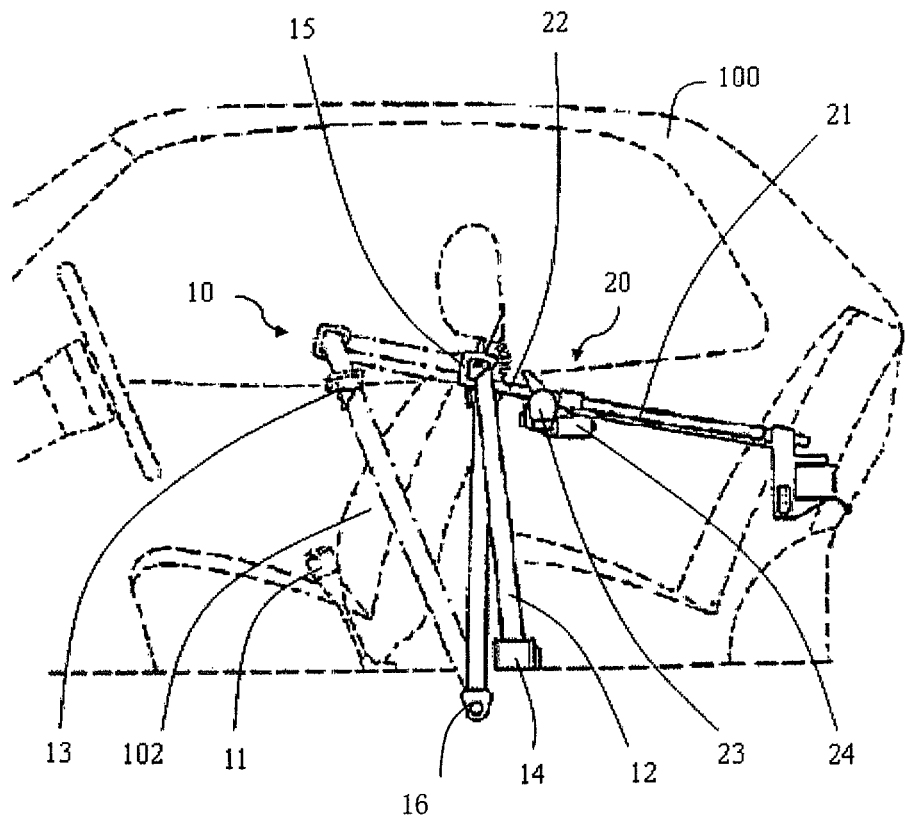
FIG. 1 illustrates a seat belt system incorporating a seat belt presenter according to a preferred embodiment of the present invention.

Referring to FIG. 1, a seat belt system 10 for a seat 102 of a vehicle 100 according to a preferred embodiment of the present invention comprises a seat belt 12 for restraining an occupant in an emergency. A first end of the seat belt 12 is coupled to a belt winder 14 for tightening or loosing the seat belt 12. The second end of the seat belt 12 is coupled to a fastener 16 which is fixed at a lower position on a body of the vehicle at one side of the seat 12. The seat belt 12 passes through a guide anchor 15 which is movable mounted at a higher position on the body on the same side of the seat as the fastener 16. A tongue plate 13 is slidably arranged on the seat belt 12 and detachably engagable with a belt buckle 11 at the other side of the seat. A stopper is fixed to the seat belt to prevent the tongue plate from sliding down the seat belt to the fastener 16, such that when the seat belt is not in use, the tongue plate is positioned near the guide anchor 15. The seat belt, and thus the tongue plate 13, is arranged to be moved by a seat belt presenter 20. When the occupant is about to wear the seat belt 12, the seat belt presenter 20 moves the guide anchor 15 forward such that the tongue plate 13 is moved to a position where it is easier for the occupant to grab hold of the tongue plate 13. After the occupant wears the seat belt 12, the seat belt presenter 20 moves the guide anchor 15 back to its initial (rest) position.

The seat belt presenter 20 comprises a tubular guider 21, a thrust rod 22, a gear 23, and an electric motor 24 for driving the thrust rod 22 via the gear 23. The tubular guider 21 is loosely sleeved on the thrust rod 22 and fixed relative to the body of the vehicle. One end of the thrust rod 22 is slidably received in the tubular guider 21, and the other end of the thrust rod 22 extends beyond the tubular guider 21 and is coupled to the guide anchor 15. The gear 23 is coupled to the motor shaft of the motor 24. The thrust rod 22 has teeth formed on the outer surface thereof for meshing with the teeth of the gear 23. The motor 24 is capable of rotating bi-directionally to rotate the gear 23 in a forward or backward direction, thereby driving the thrust rod 22 to make extension or retraction movement in relation to the tubular guider 21, which further drives the guide anchor 15 to linearly move in a corresponding direction.

The motor 24 is preferably a PMDC motor which comprises a stator and a rotor rotatably mounted to the stator. The rotor comprises a motor shaft, a commutator fixed to the motor shaft, a rotor core 242 fixed to the motor shaft and rotor windings 244 wound about teeth of the rotor core and electrically connected to segments of the commutator. The stator comprises at least one permanent magnet and at least two brushes in sliding contact with the commutator to feed current to the rotor windings via the commutator. In a preferred example, the stator has two permanent magnetic poles.

Figure 2A:
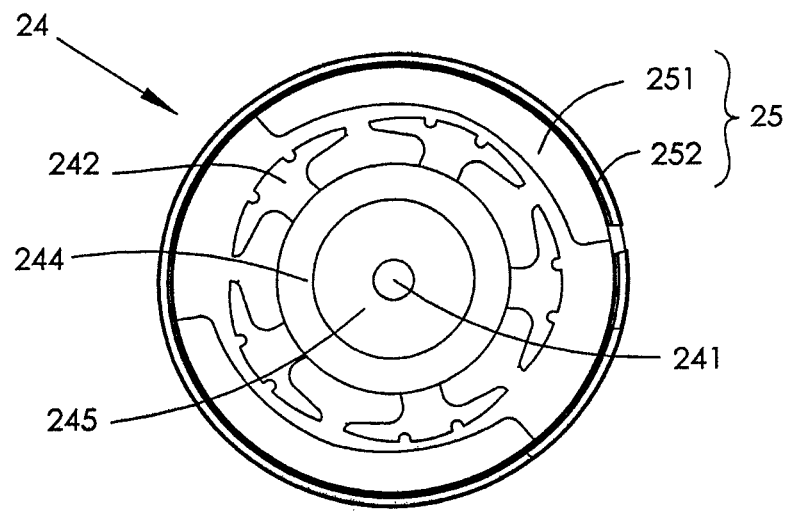
FIG. 2a is a cross sectional view of the motor of FIG. 2.
Figure 2:
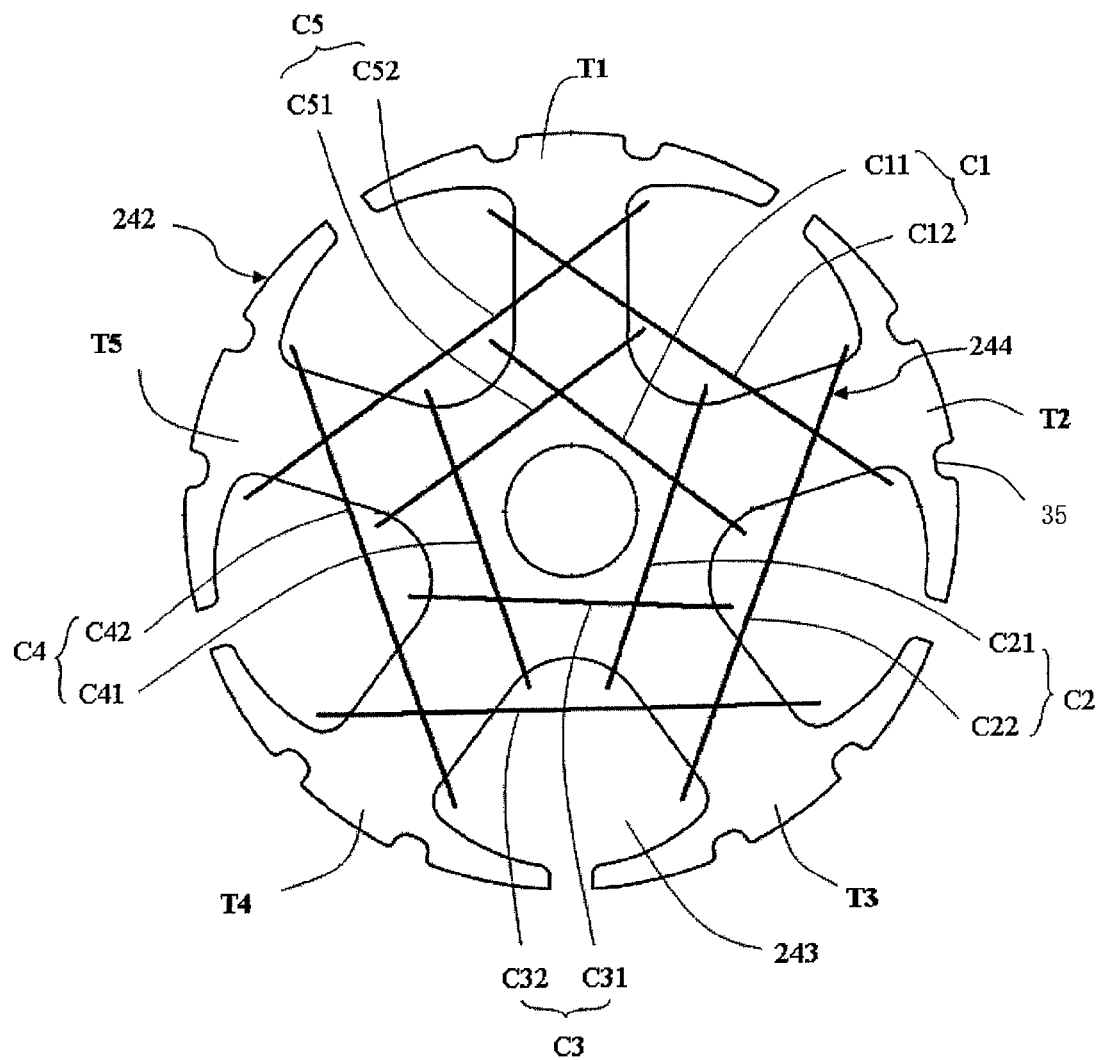
FIG. 2 illustrates a rotor core and rotor windings of a motor used in the seat belt presenter of FIG. 1.

FIG. 2 illustrates the rotor core 242 and the rotor windings 244. The rotor core 242 comprises five teeth T1~T5. Winding slots 243 are formed by adjacent teeth and receive the rotor windings. The rotor windings 244 comprise ten coils Cn1 and Cn2, n=1, . . . ,5. The ten coils form five winding units Cn, n=1, . . . ,5, each of which comprises two coils. A first winding unit C1 comprises the coils C11 and C12. A second winding unit C2 comprises the coils C21 and C22. A third winding unit C3 comprises the coils C31 and C32. A fourth winding unit C4 comprises the coils C41 and C42, and a fifth winding unit C5 comprises the coils C51 and C52. Each of the coils of a winding unit is wound about the same teeth and electrically connected to the same pair of segments in parallel.

FIG. 2a is a cross section of the motor 24. The motor has a stator 25 having two magnetic poles formed by two arcuate permanent magnets 251 fitted to an inner surface of a motor housing 252. The commutator 245 is also shown, fitted to the motor shaft 241.

Figure 3:
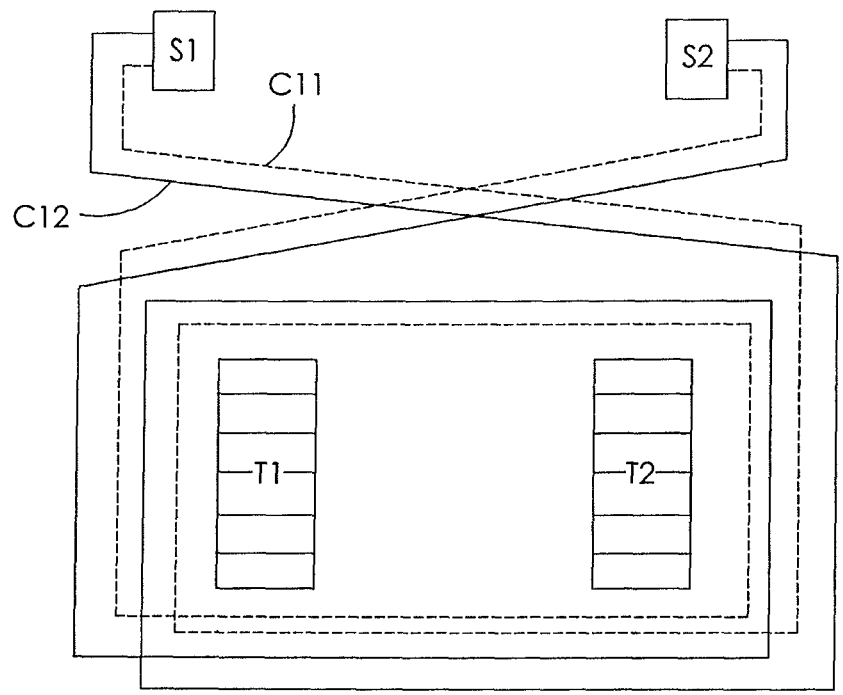
FIG. 3 illustrates a winding unit of the rotor windings of FIG. 2.
Figure 4:
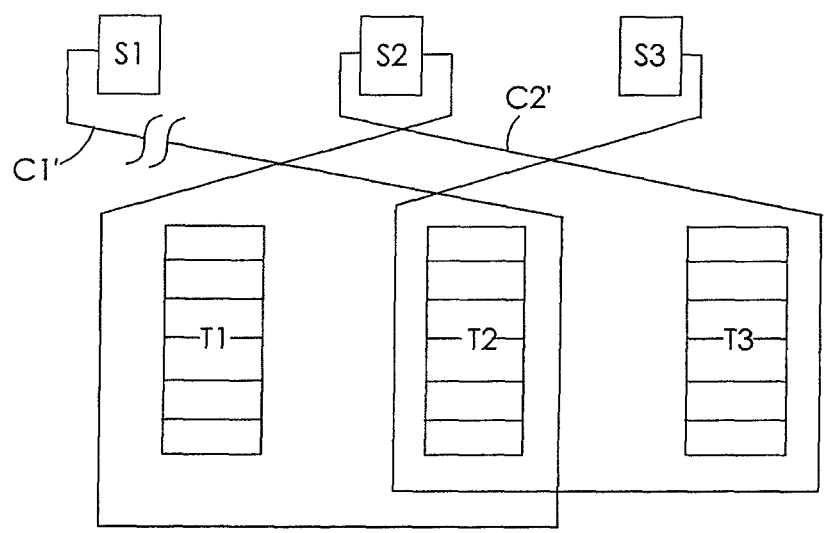
FIG. 4 illustrates rotor windings of a traditional motor used in a prior art seat belt presenter.

FIG. 3 illustrates the first winding unit comprising coils C11 and C12. Both of the coils C11 and C12 are wound about teeth T1 and T2 and are connected to segments S1 and S2. Therefore, the coils C11 and C12 are electrically connected in parallel. If one of the coils C11 and C12 is open circuited, the current still flows through the first winding unit via the other coil. Thus, the motor still works, with only a slight performance loss. Therefore, a seat belt presenter using the motor is more reliable compared to traditional seat belt presenters. A coil is said to be open circuited or open when the wire forming the coil is broken such that current can not flow through the coil from one segment to the next.

In this embodiment, the rotor windings comprise inner layer windings and outer layer windings. The coils Cn1, n=1, . . . ,5, are arranged in the inner layer, while the coils Cn2, n=1, . . . ,5, are arranged in the outer layer. That is, for each winding unit, one of the two coils is disposed in the inner layer, and the other one of the two coils is disposed in the outer layer. During the winding process, the inner layer coils are wound first and then the outer layer coils are wound. Compared with the inner layer coils, the outer layer coils are further from the center of the rotor core. This reduces the likelihood that both coils of a single winding unit would be damaged at the same time as the outer layer provides physical protection for the inner layer. The rotor windings can be wound by using a single flyer winding machine. That is, the inner layer coils and the outer layer coils are wound by one continuous wire.

Alternatively, the rotor windings can be wound by using a dual flyer winding machine having two flyers which wind the windings simultaneously. That is, the inner layer coils are wound by two separate wires at the same time, and then, the outer layer coils are wound by the two wires at the same time. In other words, some of the inner layer coils and some of the outer layer coils are wound by one continuous wire. The remaining inner layer coils and the remaining outer layer coils are wound by another continuous wire. Generally, the inner layer coils and the outer layer coils wound by the same one wire are disposed opposite about the rotor shaft. Winding the rotor windings with two flyers improves the manufacturing efficiency.

In this embodiment, the number of segments is equal to the number of winding units and also equal to the number of teeth. During the winding process of the inner layer coils, the wire is attached to each segment. During the winding process of the outer layer coils, the wire is attached to the each segment again.

Further more, two dummy slots 35 are formed in the circumferential surface of each tooth of the rotor core. The dummy slots 35 extend along a direction parallel to the direction of the winding tunnels, which in FIG. 2 is parallel to the axis of the motor. The dummy slots divide the circumference surface of each tooth into three parts. Vibration and noise are reduced by the dummy slots 35.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, each winding unit of the rotor windings may comprise more than two coils.

The invention claimed is:

1. A seat belt presenter for moving a tongue plate of a seat belt system to a desired position, comprising:
   a transmission mechanism for moving the tongue plate from a first position to a second position; and
   an electric motor for driving the transmission mechanism, the motor comprising a stator and a rotor rotatably mounted to the stator, the rotor comprising a motor shaft, a commutator fixed to the motor shaft, a rotor core fixed to the motor shaft and rotor windings wound about teeth of the rotor core and electrically connected to segments of the commutator, the rotor windings comprises a plurality of winding units, each winding unit comprising at least two coils, the coils of each winding unit being wound about the same teeth and electrically connected to a same pair of segments in parallel;
   wherein the rotor windings are arranged in two layers, an inner layer and an outer layer, and wherein each winding unit comprises a first coil and a second coil, the first coils being arranged in the inner layer, the second coils being arranged in the outer layer, and wherein each of the first coils is located closer to a rotation center of the rotor than each of the second coils.

2. The seat belt presenter of claim 1, wherein the two coils of one winding unit are radially spaced from each other.

3. The seat belt presenter of claim 1, wherein the rotor windings are wound by one continuous wire.

4. The seat belt presenter of claim 1, wherein a part of the first coils and a part of the second coils are wound by one continuous wire, and the other part of the first coils and the other part of the second coils are wound by another continuous wire.

5. The seat belt presenter of claim 1, wherein at least one dummy slot is formed in a circumferential surface of each tooth of the rotor core.

6. The seat belt presenter of claim 1, wherein the rotor core comprises five teeth, and each tooth comprises two dummy slots formed in a circumferential surface of the tooth.

7. The seat belt presenter of claim 1, wherein the number of the teeth is the same as the number of the segments.

8. The seat belt presenter of claim 1, wherein the stator has two magnetic poles, the rotor core has five teeth, and the commutator has five segments.

9. The seat belt presenter of claim 1, wherein the transmission mechanism comprises a stationary tubular guide, a thrust rod slidably received in the guide, and a gear coupled between the motor and the thrust rod for converting the rotary movement of the motor into linear movement of the thrust rod.

* * * * *